United States Patent [19]

Brown et al.

[11] Patent Number: 5,103,960
[45] Date of Patent: Apr. 14, 1992

[54] RESERVOIR FOR ROD-LIKE ARTICLES

[75] Inventors: Anthony R. Brown; Neil Thorp, both of High Wycombe, Great Britain

[73] Assignee: Molins PLC, High Wycombe, United Kingdom

[21] Appl. No.: 585,176

[22] Filed: Sep. 20, 1990

[30] Foreign Application Priority Data

Sep. 20, 1989 [GB] United Kingdom ................. 8921237
Oct. 20, 1989 [GB] United Kingdom ................. 8923660

[51] Int. Cl.$^5$ .............................................. B65G 1/00
[52] U.S. Cl. .................................................. 198/347.1
[58] Field of Search ........................... 148/347.1, 347.3

[56] References Cited

U.S. PATENT DOCUMENTS

| 4,222,477 | 9/1980 | Molins et al. | 198/347.3 |
| 4,328,886 | 5/1982 | Seragnoli | 198/347.3 |
| 4,366,895 | 1/1983 | Bennett et al. | 198/347.3 X |
| 4,413,640 | 11/1983 | Wahle et al. | 198/347.3 X |
| 4,813,527 | 3/1989 | Carter | 198/347.1 |

FOREIGN PATENT DOCUMENTS

| 0364250 | 7/1963 | Belgium | 198/347.3 |
| 1292069 | 4/1969 | Fed. Rep. of Germany | 198/347.1 |
| 2050551 | 4/1972 | Fed. Rep. of Germany | . |
| 2640719 | 3/1978 | Fed. Rep. of Germany | 198/347.1 |
| 2747491 | 4/1979 | Fed. Rep. of Germany | 198/347.1 |
| 995663 | 6/1965 | United Kingdom | . |
| 2132969 | 7/1984 | United Kingdom | 198/347.3 |
| 2133759 | 8/1984 | United Kingdom | . |

Primary Examiner—D. Glenn Dayoan
Attorney, Agent, or Firm—Antonelli, Terry, Stout & Kraus

[57] ABSTRACT

A linear variable capacity reservoir, particularly for rod-like articles of the tobacco industry, includes a boundary device (18;76) movable between an entrance (22;78) at one end and an exit (48;81) at the other end to vary the capacity of a main reservoir storage area (24;66). The boundary device (18;76) carries an end pulley (30;90) for a variable length extendible conveyor (32;88) which conveys a stream of articles from the main storage area to the exit. In another version the reservoir includes a movable end wall (216) movable towards and away from a stationary end wall (217) to vary the capacity of the reservoir storage area (220), and a variable length conveyor (218) extendible into the storage area from the stationary wall. When the storage area is empty a direct vertical path (212) for articles exists between the stationary and movable end walls. The extendible conveyors (32;88;218) are supportable by spaced retractable horizontal rollers (46) carried by vertical spindles (48).

8 Claims, 6 Drawing Sheets

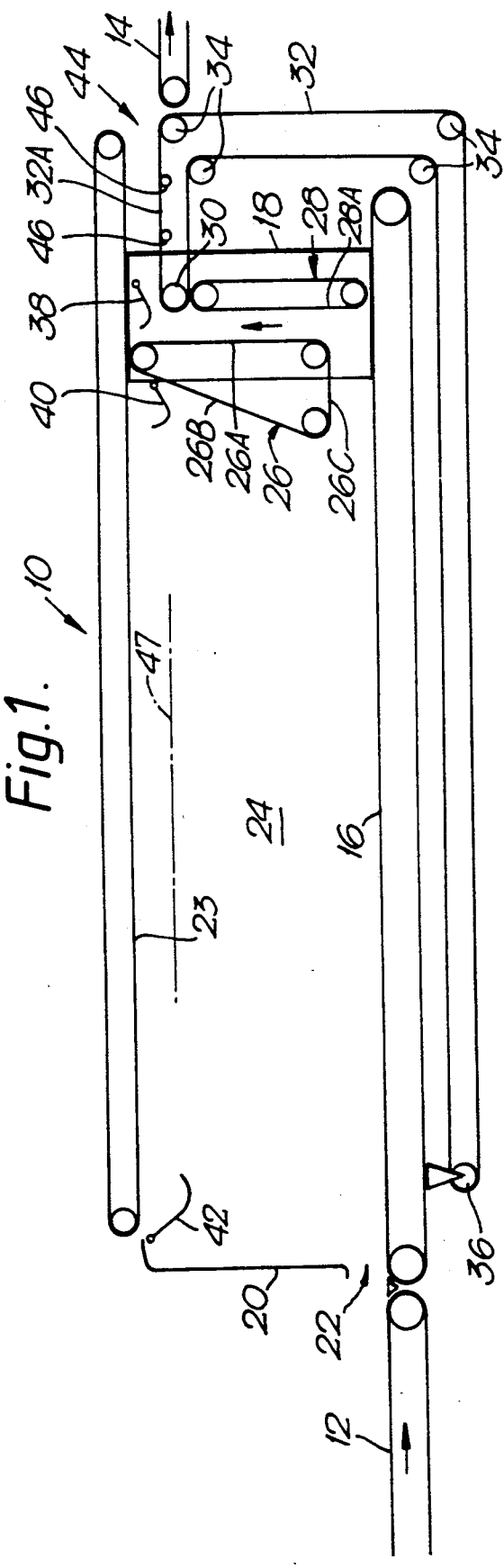
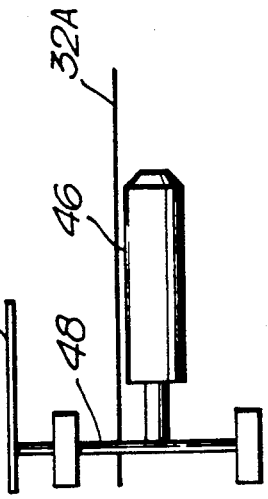

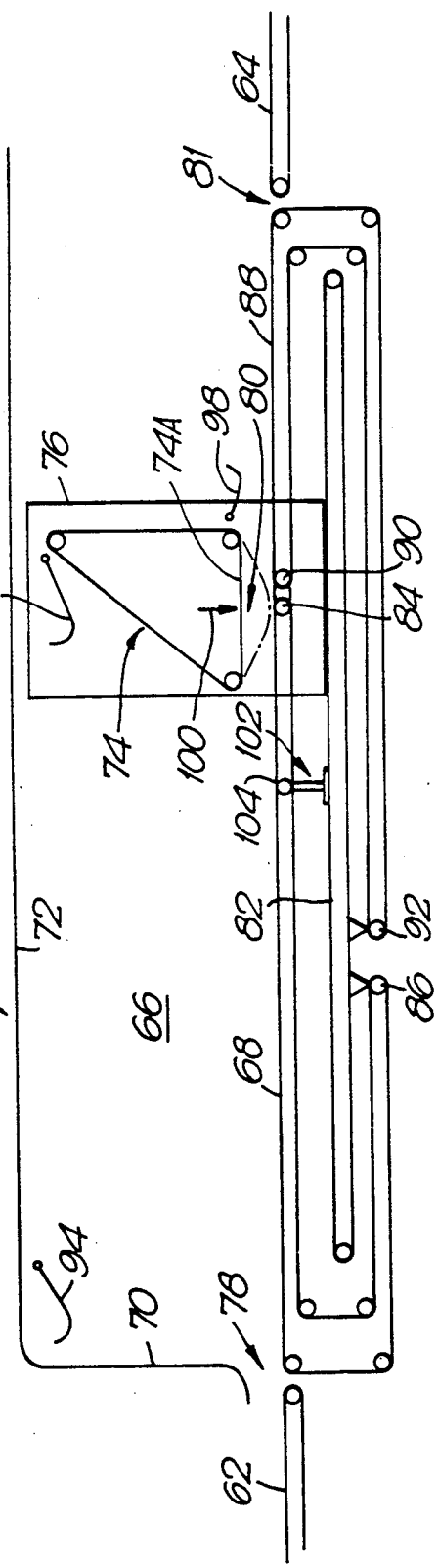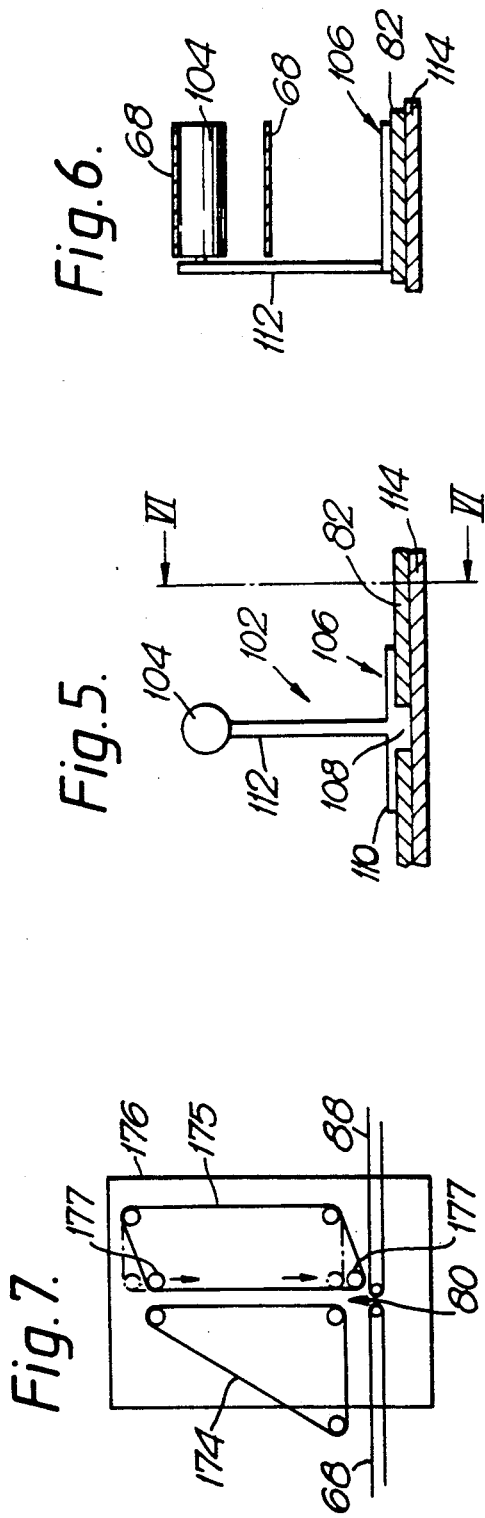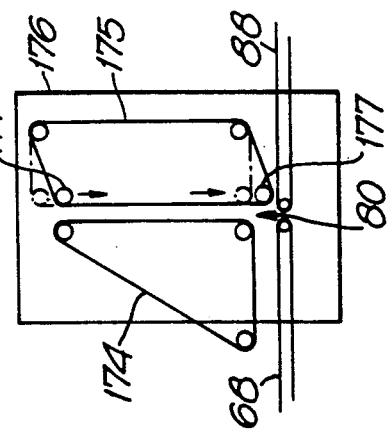

RESERVOIR FOR ROD-LIKE ARTICLES

BACKGROUND OF THE INVENTION

This invention relates to reservoirs for rod-like articles, particularly articles of the tobacco industry such as cigarette filter rods or cigarettes, in which the articles are stored in multi-layer stack formation.

According to one aspect of the invention a reservoir for rod-like articles includes means defining a variable capacity storage region including a movable end wall which is movable towards and away from a stationary end wall to vary the capacity of the region, extendible guide means movable with the movable end wall and spaced therefrom to define therewith a passage for rod-like articles, said guide means being extendible from a position intermediate said stationary wall in which position said movable end wall and said stationary wall define a substantially vertical path extending from an upper inlet to a lower outlet and which path includes said passage, said guide means when extended into said storage region defining an extended path between said inlet and said outlet including an upper portion extending from an upper part of said vertical path to said movable end wall and a lower portion extending from said movable end wall to a lower part of said vertical path. Preferably said upper and lower portions are each arranged to support multi-layer streams of rod-like articles. Preferably the stream on said lower portion is significantly deeper than that on the upper portion, i.e. the extendible guide means projects into the storage region nearer to the top of the storage region than to the bottom.

Preferably the bottom of the storage region is defined by a movable conveyor for supporting and conveying rod-like articles. This movable conveyor and the movable end wall preferably move at the same rate when the end wall is moving towards the stationary wall, i.e. when the capacity of the storage region is being reduced, thereby ensuring that no voids are created in the storage region.

The extendible guide means may comprise drivable conveyor means, so that it may convey a stream of rod-like articles in the storage region towards the movable end wall. Where the guide means comprises an extendible band, parts of the band not projected into the storage region may be stored in vertical alignment with, e.g. above or below, the storage region.

According to a further aspect of the invention a reservoir for rod-like articles comprises a substantially linear variable capacity storage region, an entrance for articles at one end, an exit for articles at the other end, means for storing articles in a relatively deep stack in said storage region, movable boundary means for varying the capacity of said storage region by varying the length of said storing means, and means for varying the operative length of at least one article conveyor extending at least part of the distance between said entrance and said exit.

In a preferred arrangement the movable boundary means comprises means arranged at a downstream end of said storing means and includes means for conveying articles towards said exit. Such conveying means may comprise endless band conveyor means having guide means movable with said boundary means.

The boundary means preferably includes or at least defines means for passing articles between the entrance and the exit. Preferably the boundary means includes means for impeding passage of articles delivered from the storing means. Such impeding means may comprise a conveyor path along which articles may pass only when conveyor means associated with the path is operated, or may comprise a movable gate. Where the impeding means comprises conveyor means this may include an elevator and/or means for displacing part of the conveyor means to block or reduce the width of a path for articles.

The boundary means may be reversibly movable between said entrance and said exit and may incorporate conveyor means capable of moving articles towards an exit. Where the storage region extends substantially horizontally the boundary means may be movable with a floor conveyor for the storage region; alternatively the boundary means may be movable independently of such a floor conveyor. The boundary means may be cyclically reciprocable in order to encourage through-flow in the reservoir, particularly under conditions where the rates of supply and demand are substantially matched. Through-flow could also be encouraged by inclining the reservoir slightly.

The reservoir may include a variable length conveyor extending from the boundary means to the exit of the reservoir. Alternatively, or additionally, variable length conveyor means may extend from the entrance of the reservoir to the boundary means. The operative run of the or each variable length conveyor may be supported by means of extendible support means. Such means may comprise spaced elements which are movable from retracted positions out of the path of the leading end of the conveyor as it advances but movable by cam means (operated by means movable with said leading end) into an operative position to support the conveyor after the leading end has passed. In a preferred arrangement the spaced elements comprise horizontal support rollers each connected to a vertical pivot so as to be displaceable about a vertical axis from a position parallel to and at one side of the conveyor and into positions transverse and immediately beneath the operative run of the conveyor. Cam means is provided to move said support rollers into their operative positions on extension of the variable length conveyor and to return the rollers to retracted positions on retraction of the conveyor.

Where the extendible guide means of the first aspect of the invention comprises an extendible band the operative run of the latter may be supported by extendible support means in a manner similar to that mentioned in the previous paragraph.

A reservoir according to the invention is particularly conveniently usable for buffer storage of cigarette filter rods delivered pneumatically to a filter cigarette assembly machine (i.e. a filter attachment machine) prior to utilisation of the rods by the machine. Thus the reservoir may be closely associated with a filter cigarette attachment machine and may, for example, extend horizontally above part of it.

BRIEF DESCRIPTION OF THE DRAWINGS

The invention will be further described, by way of example only, with reference to the accompanying diagrammatic drawings, in which:

FIG. 1 is a side view of a reservoir for filter rods,

FIG. 2 is a plan view of a detail of the reservoir of FIG. 1,

FIG. 3 is a side view of the detail shown in FIG. 3,

FIG. 4 is a side view of another reservoir for filter rods,

FIG. 5 is an enlarged side view of a detail from FIG. 4,

FIG. 6 is part-sectional view on the line VI—VI in FIG. 5,

FIG. 7 is a side view of a modified part of the reservoir of FIG. 4,

DETAILED DESCRIPTION OF THE PREFERRED EMBODIMENTS

Figure 8:
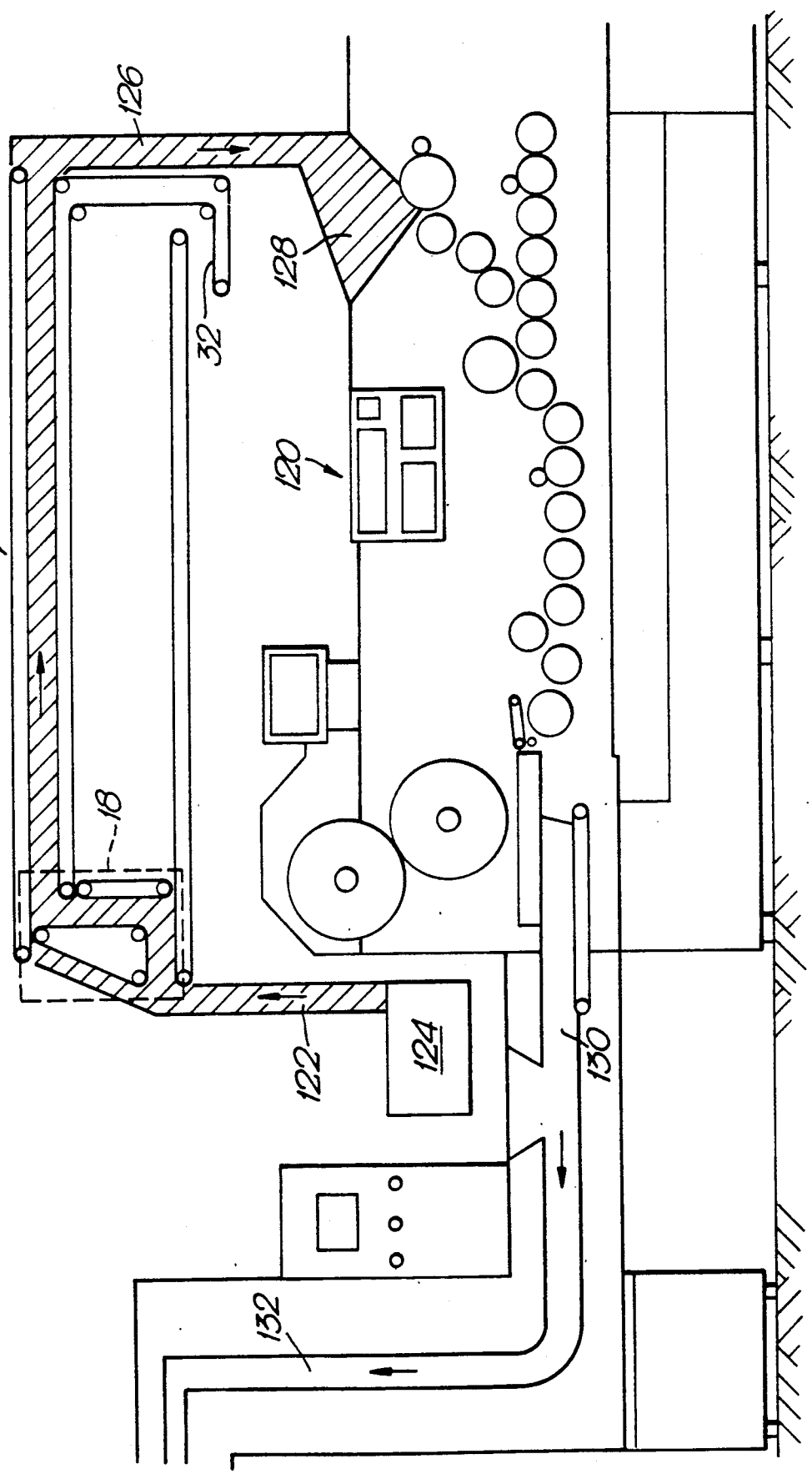
FIG. 8 is a side view of a filter attachment machine incorporating a reservoir similar to that of FIG. 1 in a first operative condition.

FIG. 1 shows a variable capacity reservoir 10 for filter rods arranged to receive a multi-layer stream of rods from a conveyor band 12 and to deliver a multi-layer stream of rods to a conveyor band 14. In a preferred arrangement the band extends from a pneumatic filter rod receiver unit (not shown) and the conveyor band 14 extends towards the filter rod input of a filter cigarette assembly machine (not shown). In this preferred arrangement the reservoir 10 may be mounted adjacent to or integrally with the assembly machine. The heights of the streams of conveyors 12 and 14 are conveniently (but not necessarily) the same (e.g. 100 mm).

The reservoir 10 includes a reversible conveyor 16 which carries a head unit 18. The conveyor 16 defines with a vertical wall 20 an entrance 22 to the reservoir 10. Extending above the conveyor 16 from the region of the wall 20 to that of the band 14 is a top band 23. The space 24 between the wall 20 and the movable head unit 18 and between the bands 16 and 23 provides the main variable capacity store of the reservoir 10. The head unit 18 is not connected to the top band 23.

The head unit 18 carries and second bands 26, 28 and a movable end pulley 30 of a band 32 which also extends around stationary (rotatable) pulleys 34 and a further movable end pulley 36. The pulley 36 is connected to the lower run of band 16. The head unit 18 also carries a first sensor 38 arranged approximately above the pulley 30 and a second sensor 40 extending into the store space 24. A further sensor 42 is arranged adjacent the upper end of the wall 20. Although the sensors 38, 40 and 42 are shown as of conventional pivoted lever or so-called "spoon" type, they could be of any convenient type capable of detecting level of filter rods, e.g. incorporating photodetectors of proximity sensors.

The bands 26, 28 have vertical runs 26A, 28A which define an upward path for rods from the region of the floor conveyor 16. The conveyor 26 has runs 26B, 26C which, when the conveyor is moved in an anticlockwise direction as viewed in FIG. 1, tend to move rods towards the base of this path. At the upper end of the elevator formed between runs 26A, 28A rods are delivered onto an upper run 32A of the conveyor 32 which, together with the top band 23, defines an exit 44 from the reservoir 10.

When the rate of supply of filter rods from the conveyor 12 matches the required rate on conveyor 14 (e.g. as required by the filter cigarette assembly machine) the reservoir 10 is capable of conveying articles through the reservoir without substantial change of the quantity of articles stored in the space 24 and irrespective of the position of the head unit 18. In this mode rods introduced through the entrance 22 by the conveyor 12, thereby increasing the quantity of articles in the space 24, are compensated for by removal of rods at a similar rate by operation of the conveyors 26, 28 and 32 to convey articles to the exit 44. Note that the conveyor 16 is stationary but that the conveyor 23 may be moved (if necessary) to help convey rods in a direction from the entrance 22 to the exit 44. The rate of operation of the conveyors 26, 28 and 32 is selected by the control system so as to match the rate of supply and demand, the sensor 38 providing fine control if necessary. When the rates of supply and demand are substantially equal the control system may inhibit movement of the head unit 18; alternatively, the unit 18 may be movable in either direction in response to a rise or fall of either of the sensors 40, 42. The rates of supply and demand may be determined by sensors (not shown) respectively upstream and downstream of conveyors 12 and 14, e.g. by speed sensing devices associated respectively with a pneumatic rod receiver unit and a filter cigarette assembly machine.

In an alternative mode of operation when the rate of supply matches the rate of demand the head unit 18 is deliberately and cyclically reciprocated so that the unit is advanced towards the wall 20 until the sensor registers a "high" level and subsequently retracted until the sensor registers a "low" level. The effect of this is to encourage progressive movement of the mass of articles in the storage space 24 towards the unit 18, and to discourage prolonged presence in the reservoir of any individual articles. An alternative way of encouraging movement of articles within the space 24 during conditions of matched supply and demand rates would be to incline the floor conveyor 16 in a direction downwards away from the wall 20.

When the rate of supply on conveyor 12 exceeds the demand on conveyor 14 the conveyors 26, 28 and 32 are again operated at a rate which corresponds to that of the demand on conveyor 14. The level of rods in the space 24 therefore rises and when either of the sensors 40, 42 rises above a predetermined limit the unit 18 is moved to the right (as viewed in FIG. 1), together with the conveyor 16, to return the sensor 40 (and/or sensor 42) to its normal range. Movement of the unit 18 to increase the capacity of the storage space 24 continues until the unit reaches the end of its travel on conveyor 16. (The reservoir 10 is therefore approaching maximum capacity in the position of the unit 18 shown in FIG. 1.) During movement of the conveyor 16 and unit 18 the speeds of the conveyor 26 and 28 may be adjusted (i.e. lowered) slightly to compensate for the small additional flow rate imparted to the stream delivered to the exit 44 by the movement of the unit 18.

When the rate of demand on conveyor 14 exceeds the rate of supply on conveyor 12 the conveyors 26 and 28 are again operated at a speed which corresponds to that of conveyor 14, and this will cause lowering of the level of articles in the storage space 24, so that one or both of the sensors 40, 42 will fall below its normal range. When this happens the conveyor 16 and head unit 18 are moved to the left (as viewed in FIG. 1), thereby reducing the capacity of the storage space 24 and allowing the level of rods in the space to rise until the sensor 40 (and/or sensor 42) is in its normal range again.

Particularly when the conveyor band 12 is stationary (i.e. the supply has failed for some reason) there may be a tendency for movement of the conveyor 16 and head unit 18 to the left (as viewed in FIG. 1) to cause some rods to be forced out of the storage space 24 through the entrance 22. A movable gate (not shown), e.g. comprising a movable partition or a movable band assembly as disclosed in British patent specification No. 2017618, could be used to avoid this problem. During movement of the head unit 18 to reduce the capacity of the storage space 24 the speeds of the bands 26 and 28 are increased slightly to compensate for the additional movement away from the conveyor 14.

The top band 23 is moved at the same speed as the conveyor 32 in view of the portion which overlies the run 32A of this conveyor adjacent the exit 44. The portion of the top band 23 which overlies the storage space 24 may not generally contact the rods in the space 24 but in the event that it does so its movement is in a direction which is consistent with movement of rods from the entrance 22 towards the head unit 18 and exit 44, such movement being beneficial even when the head unit 18 is moving to the left (as viewed in FIG. 1).

It will be understood that the pulleys 30 and 36 for the conveyor 32 move by similar amounts in opposite directions during movement of the head unit 18, and that tensioning means is provided for maintaining the band 32 taut during such movement. It will be appreciated, however, that the variable length upper run 32A of conveyor 32 requires support (in view of its function of supporting a stream of rods) and that this support must extend along its variable length. One possible form of support is by way of support rollers 46 which extend along a line indicated at 47 in FIG. 1 and which normally lie outside the vertical plane of the conveyor run 32A (and of the storage space 24). Thus, as shown in FIGS. 2 and 3, each roller 46 is attached to a vertical rotatable spindle 48 carrying at its upper end an actuating plate 50 having cam surfaces 50A and 50B which are engagable by a pin 52 carried by the head unit 18. When the unit 18 passes a plate 50 during movement to the left (as viewed in FIGS. 1 and 2) the pin 52 engages the surface 50A and causes the plate 50 and support roller 46 to move through 90° so that the support roller 46 is moved from its position out of alignment with the conveyor run 32A and into a supporting position as shown in dotted outline in FIG. 2. The pin 52 is mounted in such position on the unit 18 relative to the pulley 30 for conveyor 32 that rollers 46 are brought into supporting positions beneath the conveyor run 32A relatively close to the pulley but without any interference with it. Similarly when the unit 18 is moving to the right (as viewed in FIG. 1), so that the length of the conveyor run 32A is being reduced, the pin 52 engages the cam surface 50B to cause pivoting of each roller 46 into its retracted position as the unit 18 approaches it and without interference with the pulley 30.

An alternative way of supporting the extendible run 32A of conveyor 32 would be to use means comprising members similar to the movable supports 162 shown in British patent specification No. 995663.

Operation of the reservoir 10 as described above has assumed that the storage space 24 is substantially full of articles, i.e. that the reservoir is already primed. During initial priming of the reservoir 10 rods are delivered into the storage space 24 through the entrance 22 with the unit 18 and the conveyors 26, 28 and 32 stationary. Preferably the unit 18 us also relatively close to the wall 20. The upward path defined between conveyor run 26A and 28A prevents rods reaching the exit 44 (until the conveyors 26 and 28 are operated).

The upward path between conveyor runs 26A and 28A need not extend for the height of the reservoir but should preferably be sufficient to prevent undesired movement of rods towards the exit 44 unless the output bands 26, 28 are operated. In addition, the upward path need not be vertical and could conveniently be arranged at 60° to the floor conveyor 16 and may, for example, incorporate an inclined elevator similar to that disclosed in British patent specification No. 2154534.

The entrance 22 need not be adjacent the floor conveyor 16 but could be at an elevated level, e.g. at or near the top of the wall 20. In that case priming might be necessary by hand to prevent crossed rods but, after initial filling, the reservoir would operate without manual intervention. Alternatively, or additionally, a flexible membrane extending from adjacent the top of the wall 20 could be used to help control the rods.

More generally, instead of, or as well as, a top band 23 there could be a membrane or other flexible element resting on the upper level of rods in the space 24. The membrane could be self-winding, to accommodate the variable distance between the wall 20 and the head unit 18, e.g. similar to the membrane 54 as disclosed in British patent specification No. 2124174.

Typical maximum dimensions for the storage space 24 are 420 mm high and 3500 mm long, giving an approximate capacity of 24,000 filter rods.

Another reservoir 60, having similarities with the reservoir 10, is shown in FIG. 4. The reservoir 60 extends between an input conveyor 62 and an output conveyor 64. A variable capacity storage space 66 is defined above a floor conveyor 68 by a side wall 70, upper wall 72, and a conveyor 74 carried by a movable head unit 76. The storage space 66 has a fixed entrance 78, defined between the conveyor 62 and side wall 70, and a movable exit 80, defined between the conveyor 68 and a lower run 74A of the conveyor 74. The head unit 76 is carried by the upper run of a conveyor 82. The floor conveyor 68 is of variable length and extends above the level of the conveyor 82, having a movable end pulley 84 connected to the head unit 76 and another movable end pulley 86 connected to a lower run of the conveyor 82. Similarly, a variable length output conveyor 88 extends between a movable end pulley 90 connected to the head unit 76 and a movable end pulley 92 connected to the lower run of conveyor 82. Sensors 94 and 96 are provided in the storage space 66, and a further sensor 98 is provided on the head unit 76 above the output conveyor 88. The lower run 74A of the conveyor 74 is displaceable downwards towards the end of conveyor 68, and into the position indicated by a dotted line in FIG. 4 by means indicated 100.

As compared with the reservoir 10, in which the head unit 18 is connected to the floor conveyor 16, the head unit 76 is not connected to the floor conveyor 68, so that the latter can be moved at a speed which differs from that of the head unit. Moreover, since the speed of the floor conveyor 68 is independently controllable, gate means such as that indicated at 100, can be provided at exit 80. A consequence of this is that there is no need for an upward path such as provided by conveyors 26, 28 in the reservoir 10 in order to prevent undesired outflow from the exit 80. Note that although the exit 80 is at the downstream end of the main storage space 66 the exit from the reservoir is at 81, i.e. adjacent the downstream end of the operative run of conveyor 88.

In order to fill the reservoir 60 the conveyor 68 moves at the same speed as the head unit 76 under control of the sensors 94 and 96 (i.e. the unit 76 is moved away from the wall 70 when sensor 94 registers a "high" level and is stopped if sensor 96 registers a "low" level). During filling the gate means 100 is operated to close the exit 80. The conveyor 74 and the output conveyor 88 are static.

After priming, when the supply on conveyor 62 exceeds the demand on conveyor 64, so that the storage space 66 is required to increase, the conveyor 68 and head unit 76 continue to move at the same speed under control of sensor 96 but the gate means 100 is retracted; the conveyor 88 runs at output speed, e.g. at the same speed as conveyor 64, and the conveyor 74 moves at the same speed or a speed appropriate to maintain the required stack height on output conveyor 88, as controlled by sensor 98.

When demand on conveyor 64 exceeds supply on conveyor 62, so that the head unit 76 is required to move to the left (as viewed in FIG. 4) the conveyor 88 again moves at the required speed related to that of conveyor 64, and similarly the conveyor 74 moves to maintain the stack height at sensor 98. The conveyor 68 may be static, or move at the same speed as conveyor 74, or move so as to maintain adequate height at the sensor 94.

When the rates of supply and demand are substantially the same, so that no change in storage capacity is required, the conveyors 68, 74 and 88 are moved at speeds corresponding to equal flow rates, i.e. at speeds related to stack heights.

The variable length conveyors 68 and 88 may be supported by rollers in a manner similar to that described and illustrated with reference to FIGS. 2 and 3. Alternatively, they could be supported as disclosed in said British patent specification No. 995663.

A further possibility is that the conveyor 82 may carry members 102 for carrying support rollers 104 for the upper runs of conveyor 68 and 88. One (only) of these members 102 is shown in FIG. 4: FIGS. 5 and 6 show this in more detail. The member 102 comprises a base plate 106 which is connected to the conveyor 82 by means of a relatively narrow peg and socket 108 but which has relatively wide limbs 110 which extend along and rest on the upper surface of conveyor 82. The limbs 110 stabilise the member 102 on the operative upper run of the conveyor 82 but, because they are not attached to the conveyor 82, do not impede movement of the members 102 around the end pulleys of conveyor 82. Extending from the base plate 106 is an upright stem 112 from which is cantilevered the support roller 104. Note that a support plate 114 for the upper run of conveyor 82 is shown in FIGS. 5 and 6.

FIG. 7 shows a modified head unit 176 which may replace the unit 76. The unit 176 carries separate conveyors 174, 175, which replace the conveyor 74 in the unit 76. Pulleys 177 for the conveyor 175 are displaceable vertically from their normal positions (indicated in dotted lines in FIG. 7) into the position shown in full lines, in which the exit 80 is blocked. Alternatively, a modified gate of the form mentioned for closing the entrance 22 could be used. Any of the gate means mentioned previously could be incorporated in a reservoir similar to the reservoir 10 of FIG. 1, i.e. in combination with a change in level such as that defined between conveyors 26 and 28. In that case the gate could extend vertically, i.e. between the conveyor run 26C and conveyor 16, or horizontally, i.e. between the conveyor runs 26A and 28A.

Figure 9:
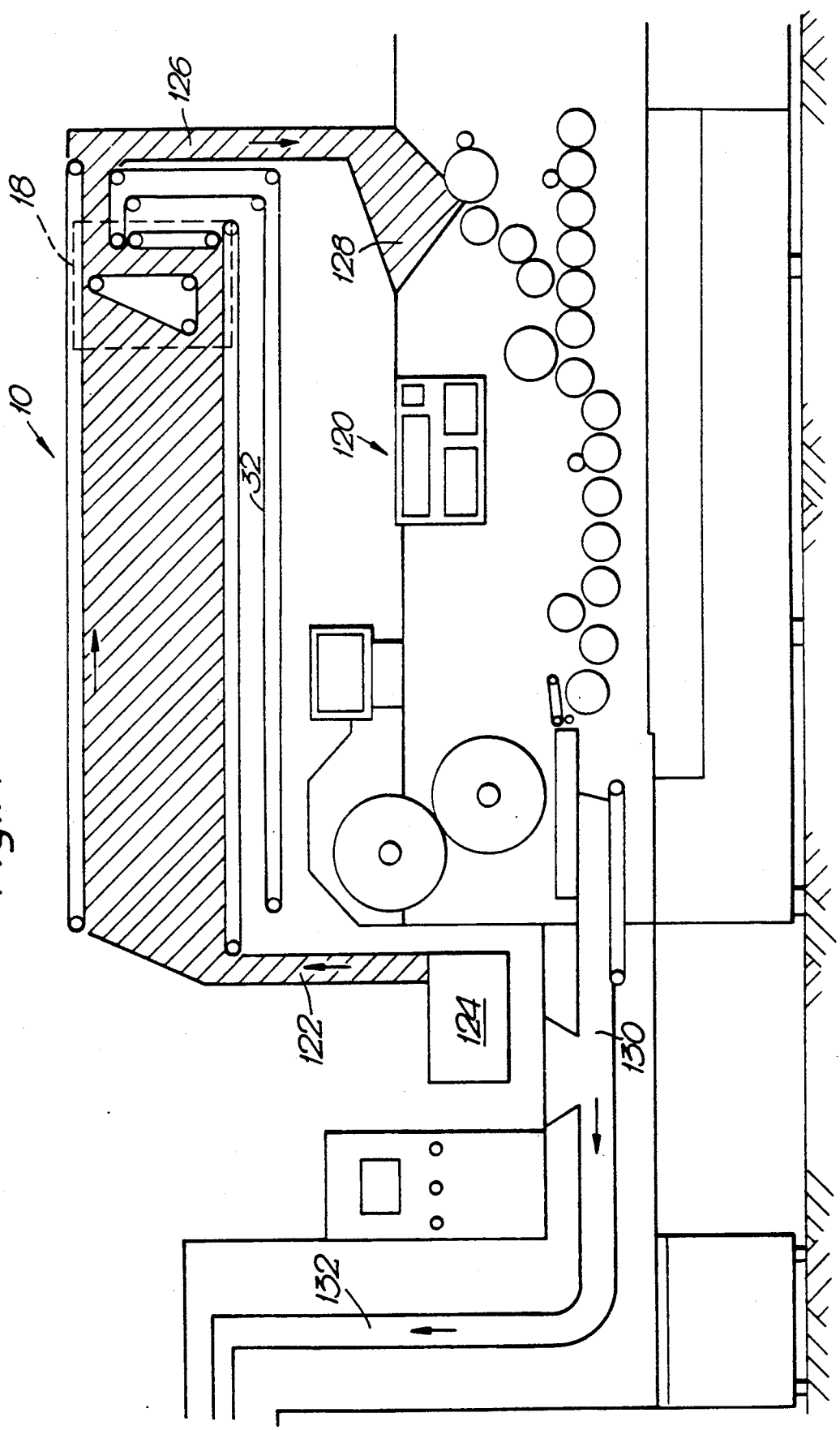
FIG. 9 is a side view, similar to that of FIG. 8 but with the reservoir in a second operative condition.

FIGS. 8 and 9 show a reservoir 10 (FIG. 1) associated with a filter cigarette assembly machine 120. The input conveyor 12 of FIG. 1 is replaced by an elevator 122 extending from a receiver unit 124 of a pneumatic filter rod distribution system. The output conveyor 14 of FIG. 1 is replaced by a downdrop or chute 126 leading to a filter rod hopper 128 of the assembly machine 120. Completed filter cigarettes are delivered by the machine 120 to an output conveyor 130 and elevator 132, by means of which a multi-layer stream of filter cigarettes is conveyed towards further processing apparatus, e.g. a packing machine (not shown). In FIG. 8 the reservoir 10 is shown in a substantially empty condition, with the head unit 18 adjacent the elevator 122; in FIG. 9 the reservoir 10 is in a substantially full condition with the head unit 18 adjacent the downdrop 126. The positions of the end pulleys of the extending conveyor 32 are correspondingly different in the different operative conditions shown in FIGS. 8 and 9. In each of FIGS. 8 and 9 the areas shown cross-hatched are substantially full of filter rods.

Figure 10:
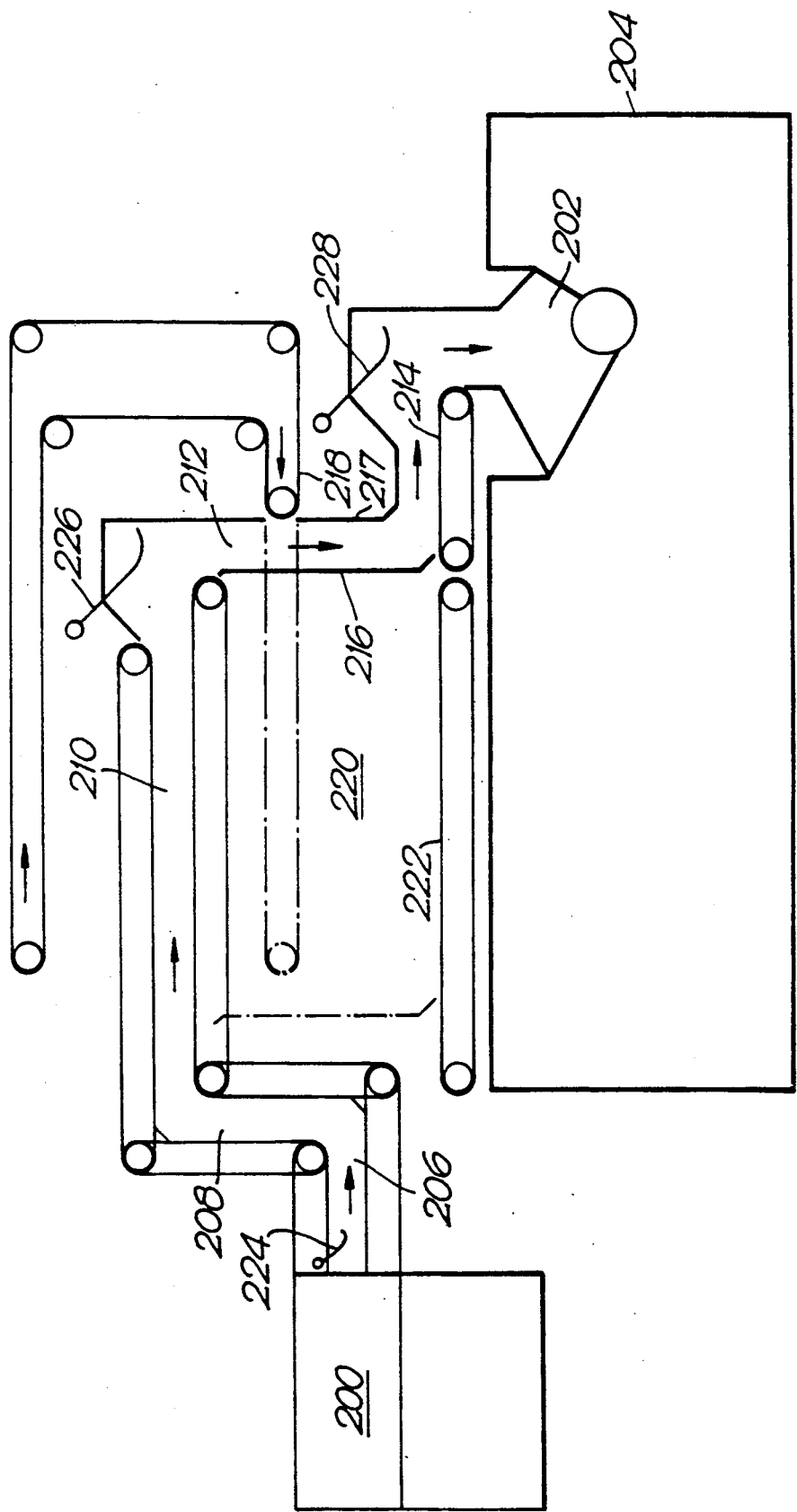
FIG. 10 is a side view of another reservoir system for filter rods.

The reservoir system of FIG. 10 extends between a receiver unit 200 of a pneumatic filter rod distribution system and a filter rod hopper 202 of a filter cigarette assembly machine 204. A multi-layer stream output from the receiver unit 200 is conveyed by means of short horizontal and vertical conveyor sections 206, 208 respectively, to an upper horizontal conveyor section 210 which, in the position shown in full lines in FIG. 10, delivers a stream of rods to a vertical downdrop 212 at the bottom of which is a short horizontal band 214 leading into the hopper 202.

One side 216 of the downdrop 212 is formed by an end plate which is movable, in conjunction with an extendible transport band 218, into a reservoir space 220 located beneath the conveyor section 210. The other side of the downdrop 212 is defined by a stationary wall 217. In the position shown in chain-dotted lines in FIG. 10 rods received from the conveyor section 210 are diverted by the extended band 218 into the reservoir region 220 to create a deep stack below the band 218 and supported on a lower transport band 222. Typically the depth of the stack supported on band 218 is 90-100 mm, that of the stack on conveyor 222 is 300-450 mm.

The system is controlled by three sensors which monitor the height of the multi-layer streams at appropriate positions. Thus there is a sensor 224 at the exit of the receiver unit 200, a sensor 226 above the downdrop 212, and a sensor 228 above the hopper 202. In FIG. 10 these sensors are indicated as of pivoted lever type; alternatively a photocell array or any other suitable level detector may be used.

The drives for the system comprise three motors and a clutch (not shown). The conveyor sections 206, 208 and 210 are driven by a first motor. The extendible band 218 is also driven from this motor via a clutch. The extension and retraction of the band 218 is done by a second motor. The bands 214 and 222 are driven by a third motor.

As shown in FIG. 10, the band 218 is stored, when retracted, above the conveyor section 210. In order to support the leading pulley and section of the band 218 when it is extended into the reservoir region 220 rollers or the like which swing into position under the extending band in a manner similar to that described with reference to FIGS. 2 and 3 may be used. Alternatively a chain extendible with the band 218 and arranged so that the pivot axes between the links are vertical could be used to support the extended section of the band.

In operation, and assuming that the system is empty, the system is arranged with the movable end wall 216 at the position shown in FIG. 10, i.e. corresponding to an empty condition of the reservoir region 220, and rods are run through the system from the receiver unit 200. Some handling may be required to ensure that leading rods do not become misaligned: this should only be necessary during initial filling, since subsequently the control system should ensure no substantial voids occur between the rods during normal operation. Assuming that the sensors 224 and 228 are in their normal ranges, indicating that the rate of supply from the receiver unit 200 matches the demand rate of the machine 204 at the hopper 202, and also assuming that the reservoir region 220 is empty, corresponding to the position shown in full lines in FIG. 10, the stream of rods is simply conveyed by way of conveyor sections 206, 208 and 210 (under control of the sensor 224) and by way of the conveyor 214 (under control of the sensor 228).

Assuming once again that the rates of supply and demand are matched, but this time that the reservoir region 220 is other than empty, the rods issuing from the end of the conveyor section 210 are diverted onto the extended band 218, which is driven to transport the rods at a speed corresponding to that of the conveyor section 210 to the upper portion of relatively deep stack on conveyor 222 in the region of the movable end plate 216. The conveyor 222 is driven at a speed related to that of the conveyor 214 in inverse proportion to the heights of the stacks conveyed by the respective conveyors. Thus the stack on conveyor 222 is being driven, relatively slowly, towards the hopper: in effect, this creates space for receiving the incoming rods from the end of the extended band 218, thereby avoiding as far as possible forward movement of incoming rods relative to rods already in the deep stack. In this way the principle of first-in first-out is substantially maintained.

When rods are being received from the receiver unit 200 at a rate greater than required at the hopper 202 the reservoir will be in a state of being filled. Initiation of filling may be made by the sensor 228 detecting a high level above the hopper 202. In response to this the clutch for the extendible band 218 is engaged and the band 218 and end plate 216 move to the left as viewed in FIG. 10. Movement of the extending band 218 and end plate 216 is controlled by the sensor 226. The lower conveyor 222 continues to move the progressively lengthening deep stack in the reservoir region 220 towards the conveyor 214 at a rate in inverse proportion to the height of the stacks on the conveyors. The lowermost run of the bands of the conveyor section 210 act as a top control for the stream of rods advanced on the extendible band 218. When the reservoir region 220 is full both sensors 228 and 226 will signal high levels and the output from the receiver unit 200 will be stopped.

When the demand for rods at the hopper 202 exceeds the supply from the reservoir unit 200 the reservoir will be required to empty in order to supplement the supply of rods. Due to the lack of rods at the hopper 202 the sensor 228 will signal a low level, which will cause the end plate 216 and the extendible band 218 to begin to retract towards the position shown in full lines in FIG. 10. The plate 216 and band 218 move at the same rate as the conveyor 222, thereby ensuring that the region 220 is maintained full of rods (i.e. with no voids) but without putting pressure on the rods in this region. If the supply deficit persists until the reservoir region 220 is empty, so that both sensors 226 and 228 will signal low levels, the assembly machine 204 will be stopped.

It will be appreciated that during both reservoir filling and emptying signals (preferably digital) relating to the rate of supply and demand respectively at the receiver unit 200 and at the assembly machine 204 may be combined (e.g. in a microprocessor) to provide a fill or empty rate signal which may control the overall rate of advancement or retraction of the plate 216 and extendible band 218, the sensors 226 and 228 being used to provide fine control as necessary.

In order to empty the conveyor system, e.g. for maintenance, the receiver unit 200 is stopped and the sensor 224 overridden to allow the system to be run to feed all remaining rods in the system into the hopper 202. The trailing edge of the rods in the conveyor section 206, 208, and 210 may be controlled by hand or by insertion of a sponge or similar element which may be conveyed by the conveyors behind the trailing edge of the rods.

The system shown in FIG. 10 could in principle be used for storage and feeding of filter cigarettes. In that case it might be necessary to compensate for tip build up of the filter cigarettes, e.g. by inclining the conveyor 222 so that the upper surface of the relatively deep stack in the region 220 is more nearly level.

Figure 11:
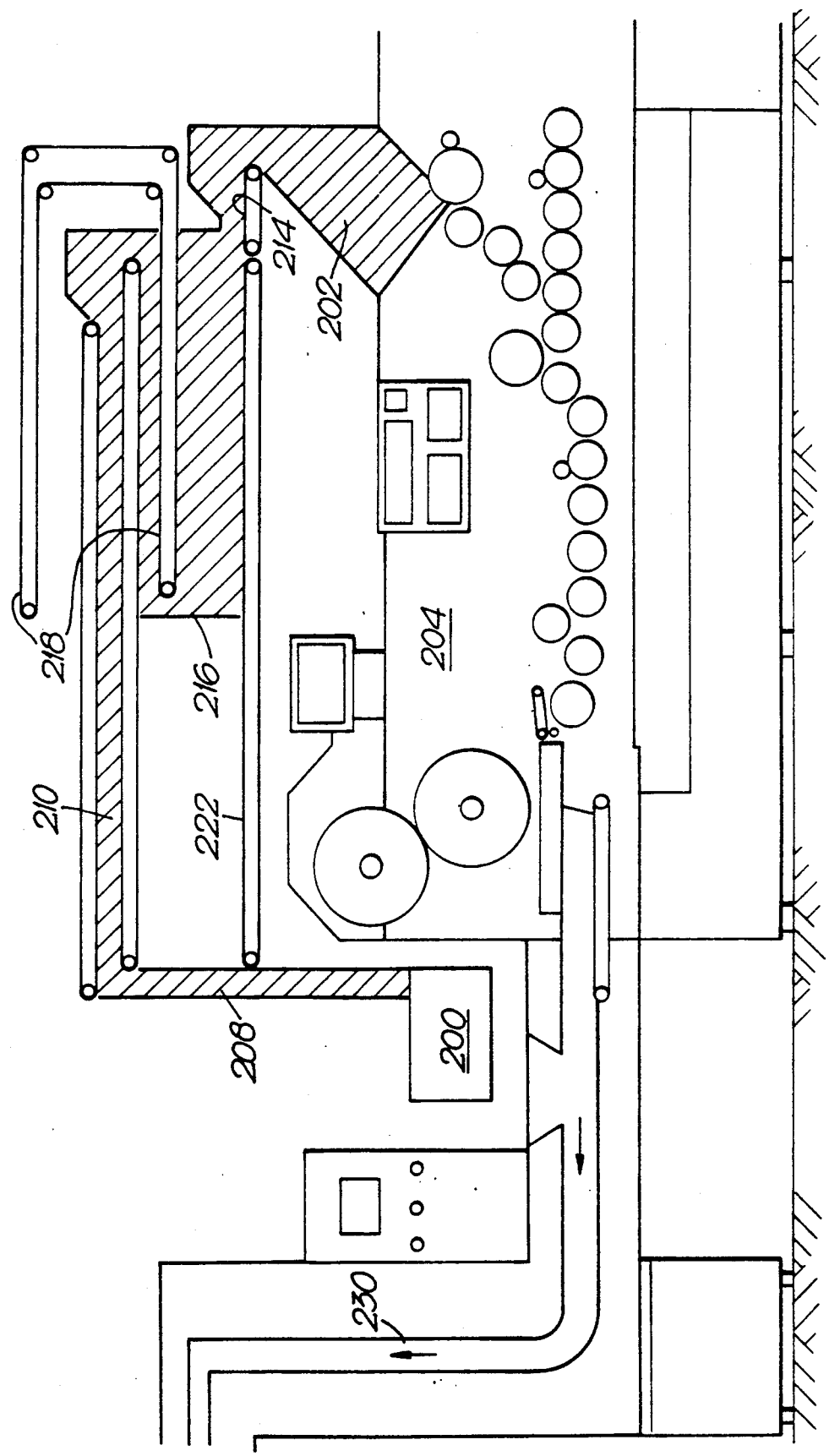
FIG. 11 is a side view of a filter attachment machine incorporating a reservoir system similar to that of FIG. 10.

FIG. 11 shows in more detail a system similar to that of FIG. 10 incorporated in a filter cigarette assembly machine 204. Completed filter cigarettes are delivered to an elevator 230 leading to a junction (not shown) with a reversible reservoir (not shown) and a packing machine (not shown). The region shown cross-hatched in FIG. 11 is substantially full of filter rods, the end plate 216 being in an intermediate position and the reservoir hence being in an intermediate state of fill.

We claim:

1. A reservoir for rod-like articles, including means defining a variable capacity storage region having an upper inlet and a lower outlet and including a stationary end wall and a movable end wall which is movable towards and away from the stationary end wall to vary the capacity of the region, extendible guide means movable with the movable end wall and spaced therefrom to define therewith a passage for rod-like articles, said guide means being extendible into said storage region from a position intermediate the length of said stationary wall, in which position said movable end wall and said stationary wall define a substantially vertical path extending substantially without obstruction from said upper inlet to said lower outlet to establish a minimum fill condition of the storage region, in which condition said path includes said passage, said guide means when extended across said vertical path into said storage region defining in said storage region an extended path between said inlet and said outlet including an upper portion extending from an upper part of said vertical path adjacent said stationary end wall to said movable end wall and a lower portion extending from said movable end wall to a lower part of said vertical path adjacent said stationary end wall.

2. A reservoir as claimed in claim 1, wherein said upper and lower portions of said extended path are each arranged to support multi-layer streams of rod-like articles moving in opposite directions.

3. A reservoir as claimed in claim 2, wherein the multi-layer stream on said lower portion of said extended path is deeper than that on the upper portion.

4. A reservoir as claimed in claim 1, wherein the bottom of the storage region is defined by a movable conveyor for supporting and conveying the rod-like articles.

5. A reservoir as claimed in claim 4, wherein the movable conveyor and the movable end wall are arranged to move at the same rate when the moveable end wall is moving towards the stationary wall.

6. A reservoir as claimed in claim 1, wherein the extendible guide means comprises a drivable variable length conveyor, arranged to convey a stream of rod-like articles in the storage region towards the movable end wall.

7. A reservoir as claimed in claim 1, wherein the extendible guide means comprises an extendible band, parts of the band not projected into the storage region being stored in vertical alignment with the storage region.

8. A reservoir for rod-like articles, including means defining a variable capacity storage region having an upper inlet and a lower outlet and including a stationary end wall and a movable end wall which is movable towards and away from the stationary end wall to vary the capacity of the region, extendible guide means movable with the movable end wall and spaced therefrom to define therewith a passage for rod-like articles, said guide means being extendible from a position intermediate said stationary wall, in which position said movable end wall and said stationary wall define a substantially vertical path extending from said upper inlet to said lower outlet which path includes said passage, said guide means when extended into said storage region defining an extended path between said inlet and said outlet including an upper portion extending from an upper part of said vertical path to said movable end wall and a lower portion extending from said movable end wall to a lower part of said vertical path, said guide means having a drivable variable length conveyor arranged to convey a stream of rod-like articles in the storage region towards the movable end wall and including means for supporting an operative run of the variable length conveyor, said supporting means including extendible support means comprising spaced elements movable from retracted positions out of the path of the leading end of the conveyor as it advances but movable into an operative position to support the conveyor after the leading end has passed.

* * * * *